United States Patent [19]
Fleming et al.

[11] Patent Number: 5,987,200
[45] Date of Patent: Nov. 16, 1999

[54] DEVICE FOR TUNING WAVELENGTH RESPONSE OF AN OPTICAL FIBER GRATING

[75] Inventors: Debra Anne Fleming, Berkeley Heights; Sungho Jin, Millington; David Wilfred Johnson, Jr., Bedminster; Paul Joseph Lemaire, Madison; Thomas H. Tiefel, deceased, late of North Plain Field, all of N.J., by Linda J. Tiefel, administratix

[73] Assignee: Lucent Technologies Inc., Murray Hill, N.J.

[21] Appl. No.: 08/957,953

[22] Filed: Oct. 27, 1997

[51] Int. Cl.[6] .............................. G02B 6/34; H04J 14/00
[52] U.S. Cl. ............................. 385/37; 385/12; 385/31; 385/141; 359/115; 359/124; 359/130
[58] Field of Search ........................... 385/12, 31, 37, 385/123, 127, 128, 141, 49, 14; 359/115, 124, 130

[56] References Cited

U.S. PATENT DOCUMENTS

| | | | |
|---|---|---|---|
| 4,996,419 | 2/1991 | Morey | 250/227.18 |
| 5,007,705 | 4/1991 | Morey et al. | 385/37 X |
| 5,042,898 | 8/1991 | Morey et al. | 385/37 |
| 5,367,589 | 11/1994 | MacDonald et al. | 385/37 |
| 5,841,920 | 11/1998 | Lemaire et al. | 385/37 |

*Primary Examiner*—Brian Healy
*Attorney, Agent, or Firm*—Mathews, Collins, Shepherd & Gould, P.A.

[57] ABSTRACT

A tunable fiber grating comprises a temperature-sensitive body secured to a fiber having a fiber grating region for transmitting thermally-induced strain to the grating. The amount of strain and hence the degree of wavelength tuning are controlled by adjusting the temperature of the temperature-sensitive body, wherein the extent of adjustment is preferably pre-determined according to feedback from a wavelength detector. Large thermal strains obtainable with the present invention allow a wide range of wavelength tuning with a relatively small and convenient temperature change near ambient temperature. In a preferred embodiment, the temperature-sensitive body is cylindrical and comprised of a nickel-titanium alloy bonded to the grating. In alternative arrangements, the thermal strain effect can be amplified. An add/drop multiplexer employing the tunable gratings is also described.

21 Claims, 5 Drawing Sheets

DEVICE FOR TUNING WAVELENGTH RESPONSE OF AN OPTICAL FIBER GRATING

FIELD OF THE INVENTION

This invention relates to optical fiber gratings and, in particular, to a device for tuning the wavelength response of an optical fiber grating.

BACKGROUND OF THE INVENTION

Optical fibers are key components in modern telecommunications systems. Optical fibers comprise strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Typical optical fibers are made of high purity silica with minor concentrations of dopants to control the index of refraction.

Optical fiber Bragg gratings are important elements for selectively controlling specific wavelengths of light within an optical fiber. A typical Bragg grating comprises a length of optical fiber including a plurality of perturbations in the index of refraction substantially equally spaced along the fiber length. These perturbations selectively reflect light of wavelength $\lambda$ equal to twice the spacing $\Lambda$ between successive perturbations, i.e. $\lambda = 2n_{eff}\Lambda$, where $\lambda$ is the vacuum wavelength and $n_{eff}$ is the effective refractive index of the propagating mode. Light of the selected wavelength $\lambda$ is reflected back to point of origin, and the remaining wavelengths pass essentially unimpeded. Such Bragg gratings are useful in a variety of applications including filtering, stabilizing semiconductor lasers, reflecting fiber amplifier pump energy, and compensating for fiber dispersion.

Bragg gratings in optical fibers are conveniently fabricated by providing a fiber having a core doped with one or more materials sensitive to ultraviolet light, such as a fiber having a core doped with germanium oxide, and then exposing the fiber at periodic intervals to high intensity ultraviolet light from an excimer laser. The ultraviolet light interacts with the photosensitive dopant to produce perturbations in the index of refraction. The appropriate periodic spacing of the perturbations to achieve a conventional grating can be obtained by use of a physical mask, a phase mask, or a pair of interfering beams.

A difficulty with conventional fiber Bragg gratings is that they filter only a fixed wavelength. Each grating selectively reflects light in only a narrow bandwidth centered around $\lambda = 2n_{eff}\Lambda$. However, in many applications, such as multiplexing, it is desirable to have a grating whose wavelength response can be tuned, that is, controllably altered.

A further difficulty with fiber grating devices relates to the sensitivity of the fiber gratings to temperature changes. Temperature-compensating packages have been designed to address this drawback. See e.g. Morey et al., U.S. Pat. No. 5,042,898, issued Aug. 27, 1991, and Yoffe et al., "Passive Temperature Compensating Package for Optical Fiber Gratings," Applied Optics, Vol. 34, p. 6859, Oct. 20, 1995.

A tunable fiber grating has been attempted with use of a piezoelectric element to strain the grating. See Quetel et al., 1996 Technical Digest Series, Conf on Optical Fiber Communication, San Jose, Calif., Feb. 25–Mar. 1, 1996, Vol. 2, p. 120, paper No. WF6. However, the strain produced by piezoelectric actuation is relatively small, limiting the tuning range of the device. Moreover, piezoelectric activation requires a continuous application of relatively high voltage, e.g., approximately 100 volts for 1 nm strain.

The present invention provides a device and method for tuning optical fiber gratings involving the use of thermally-induced strain on the fiber. The device has an enhanced tuning range and does not require continuous power, as compared with previous devices relying upon piezoelectric elements. Additionally, temperature controls are incorporated into the device, hence, the sensitivity of the grating to temperature changes can be incorporated into the programming of the wavelength tuning, avoiding the need for temperature-compensating packages.

SUMMARY OF THE INVENTION

Summarily described, the invention comprises a fiber grating secured to a temperature-sensitive body for transmitting thermally-induced strain to the grating and adjusting the grating's wavelength response. The amount of strain and hence the degree of wavelength tuning are controlled by heating or cooling the temperature-sensitive body, the extent of which is preferably predetermined according to feedback from a wavelength detector. Because of unusually large thermal strains obtainable in the inventive device, the device allows a wide range of wavelength tuning with a relatively small temperature change near ambient temperature. An add/drop multiplexer employing the tunable gratings is also described.

BRIEF DESCRIPTION OF THE DRAWINGS

The advantages, nature, and features of the invention may appear more fully upon considering the illustrative embodiments described in the accompanying drawings, in which.

It is to be understood that these drawings are for purposes of illustrating the concepts of the invention and are not to scale.

DETAILED DESCRIPTION

Figure 1:
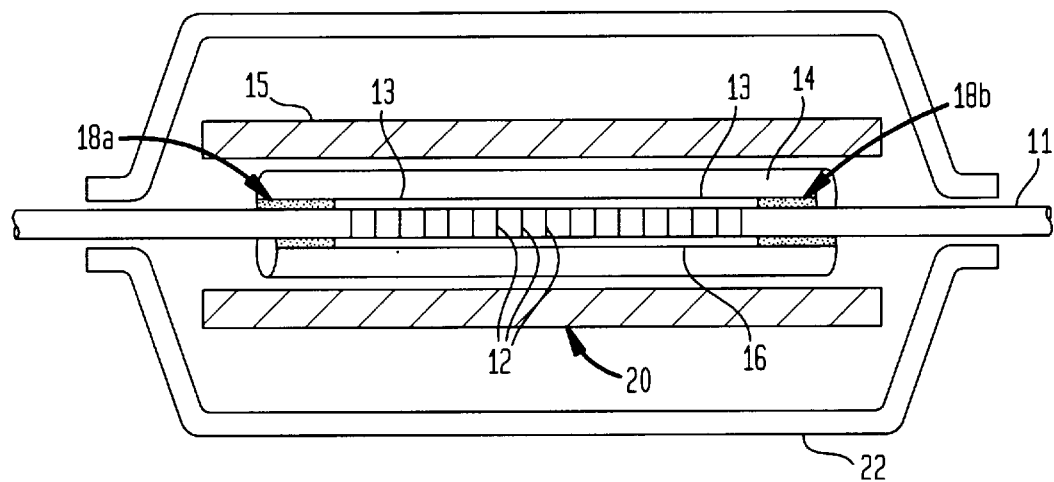
FIG. 1 schematically illustrates a thermally-tunable fiber grating according to the invention.

An embodiment of the present invention is an optical communication system comprising a tunable grating which uses a temperature-sensitive body with a large thermal expansion coefficient. As illustrated in FIG. 1, the temperature-sensitive body is bonded onto the fiber grating and exerts strain. The amount of strain and hence the degree of tuning of the spacing between the perturbations of the grating, $\Lambda_g$ (and consequently the wavelength of reflected light $\lambda$), are controlled by heating or cooling the temperature-sensitive body, the extent of which may be predetermined and automatically-controlled based on feedback from a wavelength detector.

Referring to FIG. 1, a temperature-sensitive body 14 with a large thermal expansion coefficient is bonded onto the surface of the fiber 11. The fiber has an inner core and outer cladding (not shown), with the core region incorporating a multitude of grating elements 12, to define a grating region 13. Suitable methods for securing the temperature-sensitive body 14 to the fiber 11 include soldering, brazing, epoxy bonding, glass-to-metal sealing, or cement bonding. Mechanical clamping, preferably with some recessed or grooved surface on the outside of the fiber 11 and/or the temperature-sensitive body 14, may also be used. To aid in the adhesion, one or more interface adhesion-promoting or metallization layers may optionally be added onto either the fiber or the temperature-sensitive body or both. As the level of compressive strain sought to be placed on the fiber grating increases, preferably the percentage of the fiber surface that is bonded onto the temperature-sensitive body should be increased as well. If a tensile stress is to be used, however, the bonding or clamping should be applied only at the regions just outside the grating region 13, thus minimizing the risk of deteriorating the mechanical or optical properties of the fiber. Such an approach is shown in FIG. 1, for example, as the bonding is applied at two bonding regions 18a and 18b, just outside the Bragg grating region 13.

Figure 6:
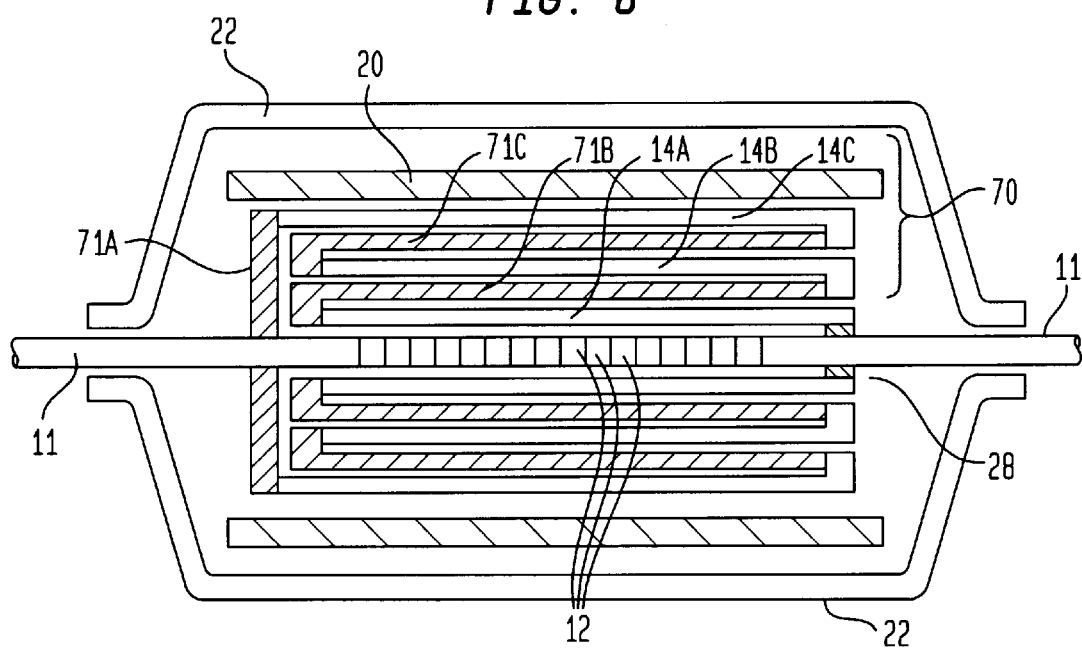
FIG. 6 represents another embodiment of the invention involving amplification of the induced strain.

A controlled heating or cooling of the temperature-sensitive body is accomplished with a heating element 20 placed near the temperature-sensitive body 14, as shown in FIG. 1. The heating element 20 can be chosen from a variety of known devices, e.g., a winding of electrical resistive heating element wire, a radio-frequency induction heater, a quartz lamp heater, or other heating devices known in the industry. Using a feedback from thermocouple, the temperature of the heating element 20 is altered to a value that corresponds with the desired strains in the temperature-sensitive body and the fiber. The desired temperature can be maintained by using an insulating oven shell 22 (as also shown in FIG. 6), until a need arises to alter the wavelength again. The heating element 20 may be placed outside the temperature-sensitive body 14, as shown in FIG. 1, or it may be incorporated with it or even disposed between the body 14 and the fiber 11.

Figure 2:
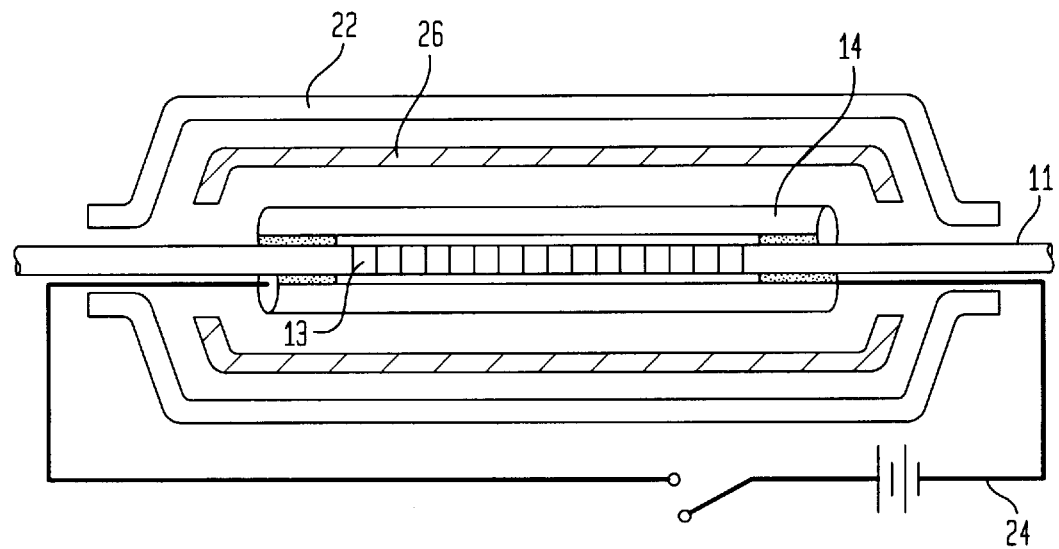
FIG. 2 represents another embodiment of the inventive thermally-tunable grating.

An advantageous approach of adjusting the temperature of the body 14, according to the invention, is to use for the heating element 20, a power source coupled to the body 14, as illustrated in FIG. 2. (In the figures, the same reference numerals are used to refer to corresponding parts of the device, as compared with FIG. 1.) Here, a power source 24 is coupled to the temperature-sensitive body for sending a continuous or interrupted current to the body 14. Resistive heating of the body thereby can be accomplished, thus eliminating the need for a separate heating device. This advantageously allows a simplified device configuration which is more compact and also more reliable (as compared, for example, with the embodiment depicted in FIG. 1).

The temperature-sensitive body can have either a positive or negative coefficient of thermal expansion (CTE). One of the preferred materials for fabricating the temperature-sensitive body is an alloy that will exhibit phase transformation (for changes in crystal structure) near room temperature. The advantages of fabricating the grating device with such alloys (as compared to devices having commonly-used metals or ceramics) include i) providing a more sensitive device with greater dimensional changes at smaller temperature changes, and ii) allowing easier resistive heating, that is, when the temperature-sensitive body itself is used as a heating element such as is illustrated with FIG. 2.

Common metallic or ceramic materials strong and stable enough to maintain a constant level of stress on optical fibers typically have CTEs of about $1-25 \times 10^{-6}/°$ C. With those materials, the amount of stress placed on a fiber (and hence the strain on the fiber grating) with a change in temperature of about 30 degrees Centigrade (i.e. between ~50° and ~80° C.), is about $7.5 \times 10^{-4}$ (or 0.075%). This amount of strain is not satisfactory for broadband control of filtering frequencies. In the present invention, the alloy used for the temperature-sensitive body has a large CTE so that sufficient stresses will be placed on the fiber to allow for a tuning range to various wavelengths at relatively small temperature changes. The body preferably imposes a strain of greater than 0.05% with a temperature change of about 10 degrees Centigrade.

An example of such an advantageous alloy for the temperature-sensitive body is Ni—Ti with an approximate composition of 56% Ni and 44% Ti in weight %. Although this alloy may exhibit a phenomenon commonly known as "shape memory effect," with this invention, the shape memory effect is avoided. With a "shape memory effect," a material plastically deformed into a certain shape will recover its original shape on heating to a moderately high temperature, due to the martensitic phase transformation by deformation and reverse transformation to the original crystal structure. However, this is not a repeatedly reversible process, because a subsequent cooling will not restore the material to its deformed configuration. Thus, in the present invention, the range of temperature change is intentionally chosen to be less than the temperature range that would be chosen for a complete phase transformation. This way, the phase transformation on heating is only partially completed (e.g., less than one-half, preferably less than one-third), and there are always some of the parent phase regions to serve as nuclei for easy and reproducible reverse transformation (and reversible dimensional changes), on cooling. Accordingly, the shape memory effect is avoided, and reversible phase transformations and associated dimensional changes (via expansion or contraction) are used.

Figure 3:
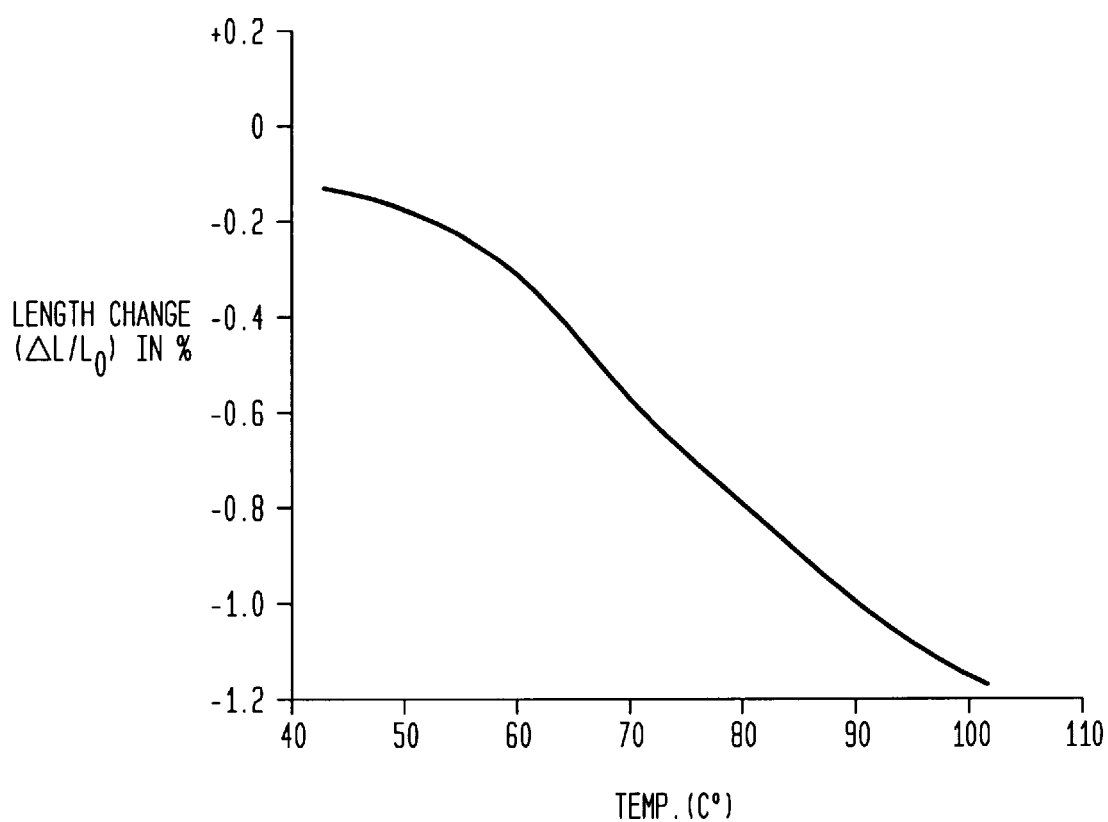
FIG. 3 shows the change in the length of a Ni—Ti alloy rod with temperature which is advantageously used in the device of FIGS. 1 and 2.

Shown in FIG. 3 is thermal expansion data for a 56% Ni—44% Ti alloy rod wire having about a 0.120 inch diameter. As reflected in FIG. 3, because of the phase transformation involved, the dimensional change in terms of strain $\epsilon 0 (\epsilon = \Delta L/L_0)$ is negative, unlike many metals and alloys which exhibit a positive coefficient of thermal expansion. For a change in temperature of 30 degrees Centigrade ($\Delta T = 30°$), where the temperature is in the range 50° to 80° C., $\epsilon$ is about $-60 \times 10^{-4}$ or about $-0.6\%$, and the coefficient of thermal expansion (CTE) is about $-200 \times 10^{-6}$. This is about an order of magnitude higher than most common metals and ceramics. The available strain of $60 \times 10^{-4}$, when transferred to optical fiber gratings in FIGS. 1 and 2, is sufficient to alter the Bragg reflection wavelength spanning about a 10 channel frequency range. If the range of temperature change is extended to 110° C., a tuning capability over a 20 channel frequency range is obtained.

In the exemplary embodiments of FIGS. 1 and 2, the temperature-sensitive body made of the exemplary alloy of FIG. 3, Ni—Ti alloy, can be bonded onto the fiber grating at the two bonding regions 18a, 18b, just outside the grating portion. Also, one can pre-strain the fiber grating by applying tension while bonding it to the temperature-sensitive body. Alternatively, if the fiber bonding is carried out at an elevated temperature, e.g., by curing epoxy at about 100 degrees Centigrade, the negative CTE of the Ni—Ti alloy will automatically provide, upon cooling to ambient temperature, a tensile pre-strain on the fiber. This way, a suitable residual strain can be maintained in the fiber at the ambient temperature. When the tunable fiber grating device is operated, i.e. by controlling the temperature changes, the negative CTE of the Ni—Ti alloy will cause the residual stress in the fiber to be reduced by a controlled amount. This will result in a tensile strain and an anticipated change in Bragg reflection wavelength.

The temperature-sensitive body can be cylindrical or it can have another shape. Exemplary variations are illustrated in FIGS. 4(a)–(e). The temperature-sensitive body can have a much larger mass than the fiber grating, and it may not be necessary to induce strain around the full circumference of the fiber. For example, one may use only one half of the pieces in FIG. 4(b)–(d), if desired (i.e. FIG. 4(e)).

The desired composition range of the Ni—Ti based temperature-sensitive body is typically about 48–64 weight % Ni, with the balance Ti, and preferably 52–60% Ni, with the balance Ti. Other alloying elements such as V, Cr, Mn, Fe, Co, Mo, Nb, Ta, W, Pd, Cu, and Zn may also be present in an amount less than 5 wt %, as long as the temperature range of phase transformation is near ambient temperature, e.g., between −50° and +150° C. Other alloys with phase transformation occurring near ambient temperature may also be used, for example, Cu—Zn—Si (30–40 wt % Zn, 0.5–1.5% Si, balance Cu), Cu—Al—Ni (10–20% Al, 1–5% Ni, balance Cu) and Cu—Sn (20–30% Sn, balance Cu). For a desirably large coefficient of thermal expansion, the phase transformation near ambient temperature (e.g. at the −50° to +150° C. range) is important to the operation of the invention. The CTE may be positive or negative depending on the specific alloy composition and processing. In shape memory type alloys involving martensitic and stress-induced phase transformations, the type and degree of residual stress in the processed alloy can be adjusted to control the magnitude and sign of the CTE. The desired magnitude of CTE in the temperature-sensitive metallic or ceramic body in the inventive devices is at least $30 \times 10^{-6}$, preferably at least $50 \times 10^{-6}$ and even more preferably at least $100 \times 10^{-6}$ near the device operation temperature.

Figure 5:
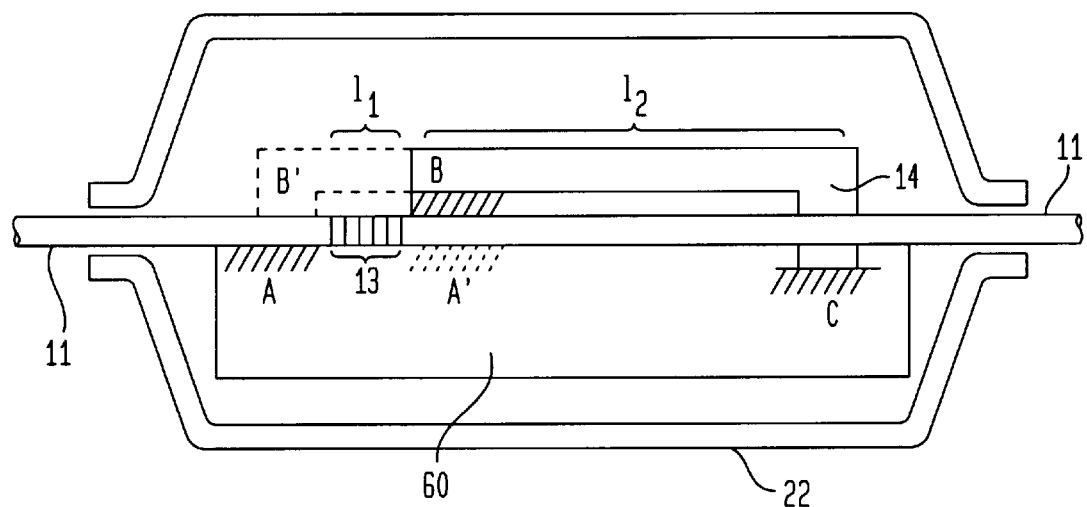
FIG. 5 illustrates an alternate embodiment of the inventive tunable grating involving a method for amplifying the thermally-induced strain.

The magnitude of thermal expansion or contraction can be amplified by an alternative embodiment of the invention as illustrated in FIG. 5. In the figure, the fiber grating region 13 has a length $l_1$ and the temperature-sensitive body 14 has a length $l_2$. At one end of the fiber grating region 13, the fiber 11 is attached and fixed onto a rigid substrate 60 at Point A. At the other end of the fiber grating region, the fiber 11 is attached to one end of the temperature-sensitive body 14 at Point B. The temperature-sensitive body is attached to the substrate 60 at Point C. When the temperature inside the oven is altered, i.e., by controlling electric power to the heating element, the body 14 expands or contracts, and if the substrate 60 is made of near-zero CTE material, the temperature-induced strain on the fiber grating is amplified by the ratio of $l_2/l_1$. As suitable near-zero CTE material to be used for this purpose is the alloy commonly known as Invar (Fe—36% Ni alloy). If the temperature-sensitive body is ten times longer than the fiber grating region 13, the strain $\epsilon_8$ will be about ten times larger than is attainable in the FIG. 1 configuration. If the substrate has a certain positive or negative CTE value (instead of a near-zero CTE), the amplification of strain will be higher or lower depending on the relative sign of the body CTE.

The substrate 60 can have a variety of shapes, the main consideration being that it extend adjacent the fiber for securing the grating and body of different lengths, i.e., the length of $l_1$ and $l_2$. Preferably, a flat-surfaced block or cylindrical configuration is used. The temperature-sensitive body 14 can also have a blocked or cylindrical shape. If the body 14 is made of positive CTE materials, the grating in FIG. 5 will contract on heating, and for negative CTE materials, the grating will elongate. The sign of induced strain can be reversed by modifying the design in FIG. 5. For example, if the temperature-sensitive body is attached onto the fiber grating at a Point B' instead of B, and the other end of the grating is attached to the substrate at Point A' instead of A, the grating will, for a body made of positive CTE material, be elongating instead of contracting. If a contracting strain on the fiber is used, the fiber should be placed in a tight-fitting, low-friction (optionally lubricated) capillary tube to minimize lateral deflection or local sticking of fiber and to maintain a uniform applied stress.

FIG. 6 shows another embodiment for amplifying the temperature-induced strain. For the temperature sensitive body, a stack 70 of interconnected temperature-insensitive layers 71A, 71B, 71C and temperature-sensitive layers 14A, 14B, 14C, is used. The layers are alternating so that opposing ends of each temperature-sensitive layer are connected to different temperature-insensitive layers. With this configuration, the effective length of the temperature-sensitive body may be increased without affecting the total length of the device itself This configuration is shown with a heating element 20 and an oven shell 22. The temperature-induced strain from the layers 14A, 14B, 14C accumulates to yield an amplified strain on the attached fiber 11 and fiber gratings 12. As additional layers are added, more strain accumulates.

For example, an assembly consisting of 10 temperature-sensitive layers comprised of a 56% Ni—44% Ti alloy (CTE $\sim -200 \times 10^{-6}/°$ C.) will produce, for a temperature change of about thirty degrees ($\Delta T = 30°$ C.), a total strain of $(\epsilon) = 10 \times 200 \times 10^{-6}/°$ C.$\times 30°$ C.$= 6 \times 10^{-2}$, or 6%. This strain is sufficient to alter the filtering frequency $\lambda_p$ spanning about a 100 channel frequency range. In view of this large amplification factor, the temperature-sensitive layers 14A, 14B, 14C, can even be made up of low CTE materials such as typical metals and alloys, e.g., brass (Cu—30% Zn) with CTE=+$20.1 \times 10^{-6}/°$ C., stainless steel (Fe—18% Cr—8% Ni) with CTE=+$17.8 \times 10^{-6}/°$ C., and an Fe—Ni—Cr alloy (Fe—35% Ni—20% Cr) with CTE=$15.8 \times 10^{-6}/°$ C.). The temperature-insensitive layers can be made up of Invar (Fe—36% Ni alloy) or other alloys having a low CTE, as long as their CTE is substantially lower than that of the temperature-sensitive layers being interconnected. Alternatively, instead of the temperature-insensitive layers, temperature-sensitive layers with a CTE having an opposing sign can be used, which would amplify the temperature-induced strain even further. The temperature-sensitive and insensitive layers can be connected by a variety of bonding methods, including soldering, brazing, spot welding, epoxy bonding, or mechanical attachment such as hooks, screws, or the like.

Figure 4A:
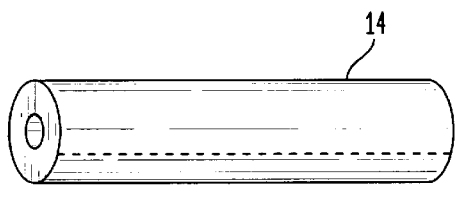
FIG. 4(a)–(e) shows various shapes of temperature-sensitive bodies useful for inducing strain in a fiber grating.
Figure 4B:
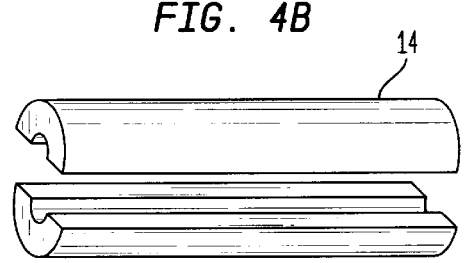
Figure 4C:
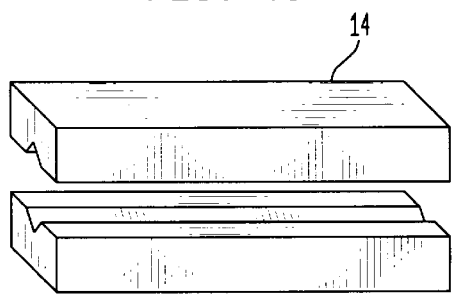
Figure 4D:
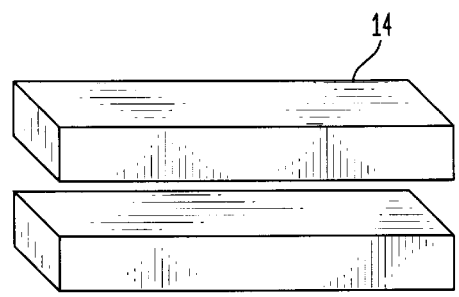
Figure 4E:
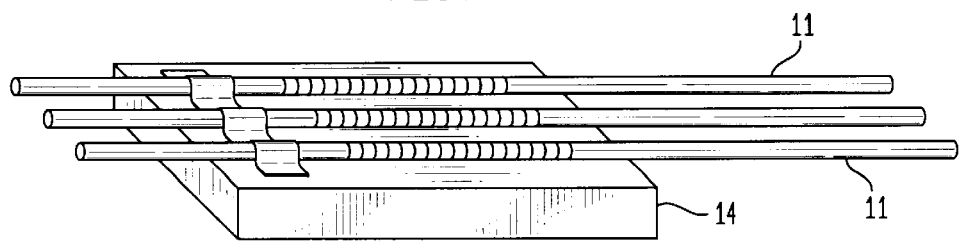

Many alternative embodiments of the tunable grating are contemplated. For example, a plurality of fibers can be secured to a single temperature-sensitive body, as shown in FIG. 4e. Alternatively, a device containing a plurality of fibers or grating regions with different perturbation periods ($\Lambda_1$–$\Lambda_4$ and $\Lambda_5$–$\Lambda_8$) can be mounted on two different temperature-sensitive bodies, each body having its own heating element and temperature controller. The use of different temperature-sensitive bodies is advantageous in increasing the range of tunable wavelengths. For example, if only one of the temperature-sensitive bodies is activated (heated into the desired temperature level), corresponding wavelengths $\lambda_1$–$\lambda_4$ in the attached fiber gratings will be filtered out. However, if the other temperature-sensitive body is also activated, wavelengths $\lambda_5$–$\lambda_8$ will be filtered out. Thus, a tunable range of $\lambda_1$–$\lambda_8$ can be obtained, as opposed to $\lambda_1$–$\lambda_4$. Similar configurations can also be used with a multitude of gratings with the same spacing, $\Lambda$, for controlling many fiber communication routes simultaneously.

Optionally and preferably, the thermally tunable gratings of this invention incorporate a feedback system using a wavelength detector coupled to a temperature sensor and temperature controller. This way, the detector signals the sensor whether the desired Bragg reflection wavelength in the fiber gratings has been achieved, and if not, the temperature is automatically readjusted by the controller to achieve the desired wavelength.

The gratings described herein are especially useful in wavelength division multiplexer/demultiplexer devices, including devices with ADD/DROP functionality. A wide variety of such devices can be made by interconnecting optical circulators and fiber gratings. In a DROP function device, the grating is typically used to separate a single wavelength from a fiber carrying multiple wavelengths. The separated wavelength is then typically diverted to another fiber, i.e., it is "dropped" from the system. Gratings as described herein permit selection and adjustment of which wavelength channel is dropped. In an ADD function device, the grating is typically used to divert a wavelength channel from another fiber onto a trunk fiber. Again, a tunable grating permits selection and adjustment of which wavelength channel is added.

Figure 7:
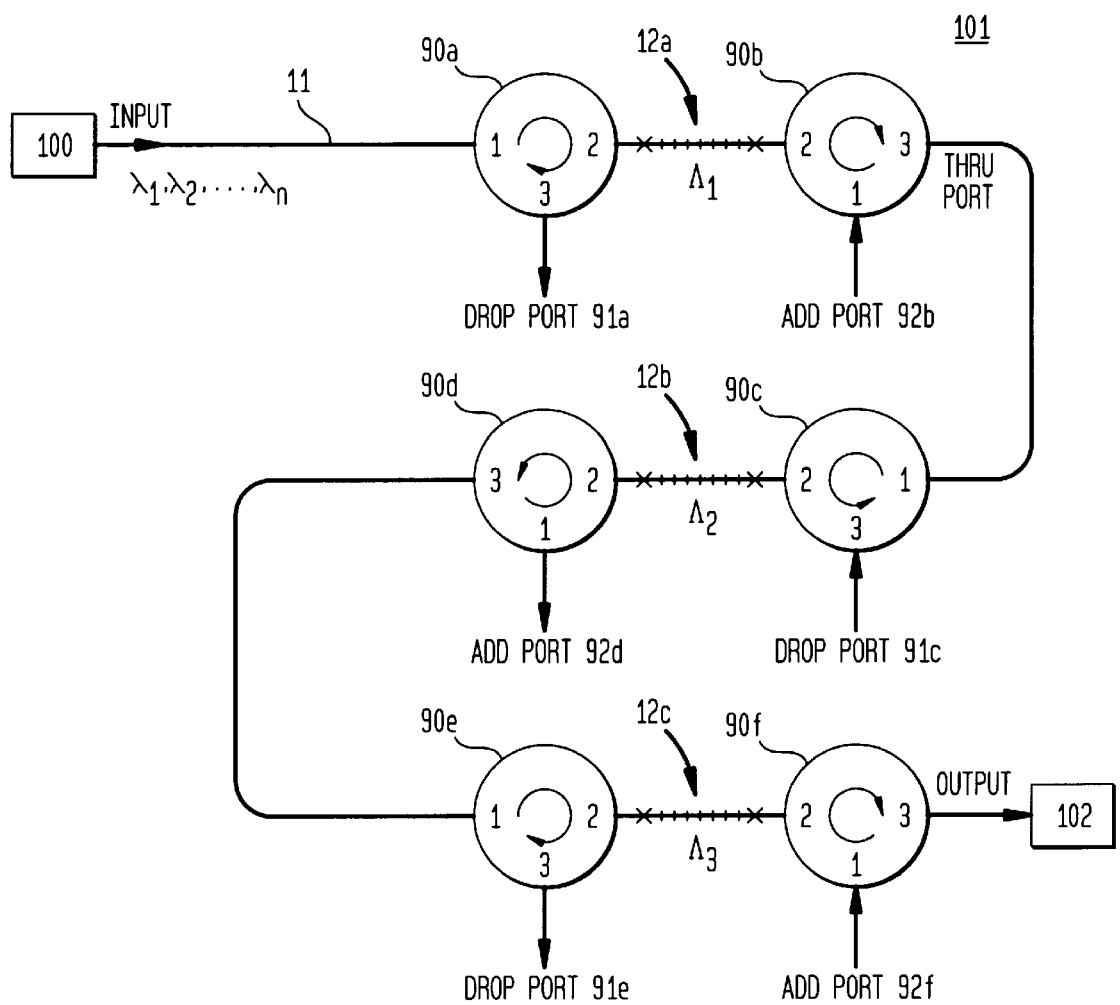
FIG. 7 illustrates an optical communications system employing an improved multiplexing/demultiplexing device using a tunable fiber grating.

FIG. 7 schematically illustrates a wavelength division multiplexed (WDM) communications system comprising a transmitter 100, an improved N-channel multiplexer/demultiplexer 101 and a receiver 102, all connected by a trunk fiber 11. The input on the fiber 11 from the transmitter 100 consists of optical signals at several wavelengths, $\lambda_1$ to $\lambda_n$.

The improved multiplexer 101 comprises one or more pairs of circulators (three are shown). The circulators of each pair are separated by a grating. For example, the first pair of circulators comprises upstream circulator 90a and downstream circulator 90b, separated by a grating 12a. The second pair of circulators 90c and 90d are separated by a grating 12b. In each pair, the upstream circulator (90a, 90c, 90e) serves to divert a forward propagating channel that matches the corresponding grating (12a, 12b, 12c) into a corresponding DROP port 91a, 91c, 91e. The downstream circulator (90b, 90d, 90f) similarly serves to insert into the fiber 11 signals at ADD ports 92b, 92d, 92f, provided the wavelengths of the signals to be added correspond to the respective gratings 12a, 12b and 12c.

With the improved device of this invention, any one of these gratings 12a, 12b, 12c is tunable as set forth above, and preferably, each one is tunable. As the grating or gratings are tuned, different channels can be selectively added or dropped. Moreover, a tunable grating can also perform a DISABLE function. If the grating is tuned between the channels, then the ADD/DROP function can be temporarily disabled.

In alternative embodiments, the improved multiplexer can comprise a single pair of circulators with a plurality of tunable gratings disposed between them for performing ADD, DROP or DISABLE functions.

It is to be understood that the above-described embodiments illustrate only a few of the many possible specific embodiments of the invention. Numerous variations can be made without departing from the spirit and scope of the invention. All such variations are intended to be included within the scope of the appended claims.

What is claimed is: What is claimed is:

1. A device for tuning the wavelength response of an optical fiber having at least one Bragg grating region with spaced-apart perturbations, the device comprising:

a temperature-sensitive body having a coefficient of thermal expansion attached to the optical fiber adjacent the Bragg grating region for transmitting strain to the fiber wherein the coefficient of thermal expansion is sufficiently large to allow for tuning the wavelength response to a plurality of wavelengths with a temperature change of less than 30° C.; and a heating element, wherein the heating element adjusts the temperature of the temperature-sensitive body to cause the body to expand or contract so that strain is induced on the fiber, thereby changing the spacing between the perturbations of the grating region.

2. The device according to claim 1, in which the heating element comprises a power source coupled to the temperature-sensitive body for sending electrical current to the temperature-sensitive body so that its temperature is adjusted through resistance.

3. The device according to claim 1, in which the temperature-sensitive body transmits a compressive strain to the fiber.

4. The device according to claim 1, in which the temperature-sensitive body transmits a tensile strain to the fiber.

5. The device according to claim 1, in which the temperature-sensitive body is cylindrical and secured to the fiber outside the Bragg grating region.

6. The device according to claim 1, in which the temperature-sensitive body is fabricated with an alloy selected from the group consisting of Ni—Ti, Cu—Zn—Si, Cu—Al—Ni, and Cu—Sn.

7. The device according to claim 6, in which the temperature-sensitive body is comprised of about forty-eight to sixty-four weight percent nickel and about thirty-six to fifty-two percent titanium.

8. The device according to claim 1, in which the fiber is pre-strained and tuning is achieved by controlled heating or cooling.

9. The device according to claim 1, in which the temperature-sensitive body is fabricated with a material having a phase transformation range of plus or minus 100 degrees Centigrade, wherein the phase transformation range overlaps with ambient temperature.

10. The device according to claim 1, in which the length of the temperature-sensitive body is greater than the length of the grating, region for amplifying the strain transmitted to the fiber.

11. A device for tuning the wavelength response of an optical fiber having at least one Bragg grating region with spaced-apart perturbations, the device comprising:

a temperature-sensitive body having a coefficient of thermal expansion attached to the optical fiber adjacent the Bragg grating region for transmitting strain to the fiber;

a heating element, wherein the heating element adjusts the temperature of the temperature-sensitive body to cause the body to expand or contract so that strain is induced on the fiber, thereby changing the spacing between the perturbations of the grating region; and a substrate having a coefficient of thermal expansion different from that of the temperature-sensitive body, wherein the length of the substrate is at least as long as the combined lengths of the grating region and the temperature-sensitive body.

12. The device according to claim 1, in which the temperature-sensitive body comprises a stack of a plurality of temperature-sensitive and temperature-insensitive layers, wherein the temperature-sensitive layers have a first coefficient of thermal expansion and the temperature-insensitive layers have a second coefficient of thermal expansion, and wherein the temperature-sensitive and temperature-insensitive layers are arranged so that they alternate and are interconnected.

13. The device according to claim 12, in which the second coefficient of thermal expansion is either zero or an opposite sign as compared with the first coefficient of thermal expansion.

14. The device according to claim 1, further comprising a feedback system for detecting the wavelength response of the grating and automatically adjusting the temperature of the temperature-sensitive body.

15. The device according to claim 1, further comprising a plurality of optical fibers with gratings secured to the temperature-sensitive body.

16. An improved optical multiplexer-demultiplexer device of the type having at least one pair of optical circulators and at least one optical fiber having at least one Bragg grating region with spaced-apart perturbations interconnected between the at least one pair of circulators, the improvement comprising a device for tuning the wavelength response of the optical fiber, the device comprising:

a temperature-sensitive body having a coefficient of thermal expansion attached to the optical fiber adjacent the Bragg grating region for transmitting strain to the fiber; and a heating element, wherein the heating element adjusts the temperature of the temperature-sensitive body to cause the body to expand or contract so that strain is induced on the fiber, thereby changing the spacing between the perturbations of the grating region.

17. An improved device according to claim 16, wherein the multiplexer-demultiplexer is an N-channel optical ADD/DROP multiplexer-demultiplexer device comprising a plurality of pairs of optical circulators and a plurality of optical fiber gratings, wherein at least one optical fiber grating is disposed between each pair of optical circulators and a device according to claim 1 is disposed adjacent each optical fiber grating.

18. A tunable optical fiber Bragg grating device, comprising:

a length of optical fiber having a Bragg grating along a portion of its length;

a temperature-sensitive body having a coefficient of thermal expansion, the body being disposed alongside the length of optical fiber so that the body will impose a strain upon the fiber of greater than 0.05 percent for a temperature change of about ten degrees Centigrade;

a heating element for controllably adjusting the temperature of the temperature-sensitive body to transmit strain to the fiber and change the wavelength response of the Bragg grating; and, a feedback system for detecting the wavelength response of the grating and automatically adjusting the temperature of the temperature-sensitive body.

19. The tunable optical fiber Bragg grating device of claim 18, wherein the temperature-sensitive body is fabricated with a material having a coefficient of thermal expansion with a magnitude of approximately $200 \times 10^{-6}/^\circ$ C.

20. The tunable grating device of claim 18 wherein temperature-sensitive body is comprised of alternating and interconnected layers of materials for imposing the strain of greater than 0.05 percent for a temperature change of about ten degrees Centigrade.

21. A device for tuning the wavelength response of an optical fiber having at least one Bragg grating region with spaced-apart perturbations, the device comprising:

a temperature-sensitive body having a coefficient of thermal expansion attached to the optical fiber adjacent the Bragg grating region for transmitting strain to the fiber, wherein the temperature-sensitive body is fabricated with a material having a coefficient of thermal expansion with a magnitude of at least $30 \times 10^{-6}/^\circ$ C.; and a heating element, wherein the heating element adjusts the temperature of the temperature-sensitive body to cause the body to expand or contract so that strain is induced on the fiber, thereby changing the spacing between the perturbations of the grating region.

* * * * *